July 11, 1950     W. L. TRACY ET AL     2,514,426
GYROSCOPIC APPARATUS
Filed Jan. 25, 1946
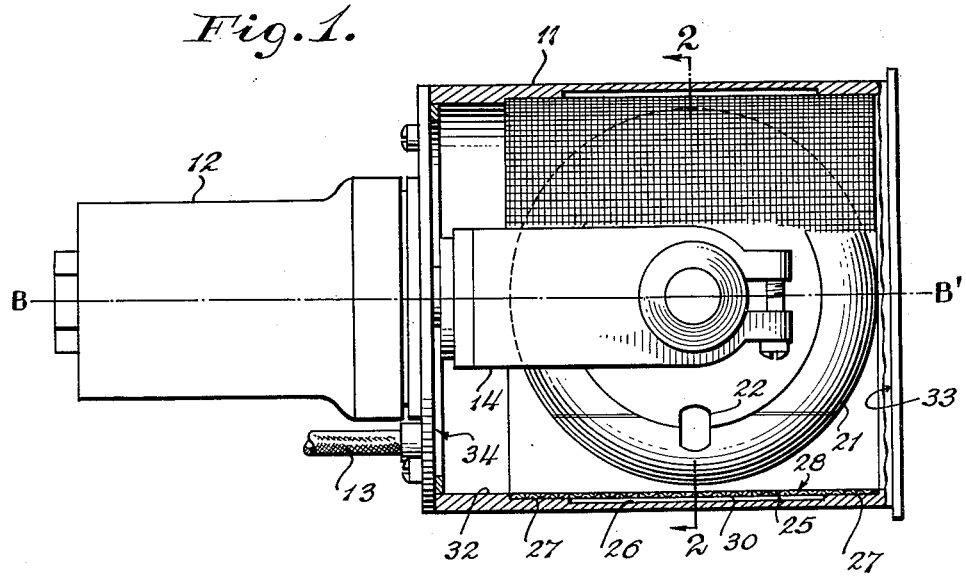
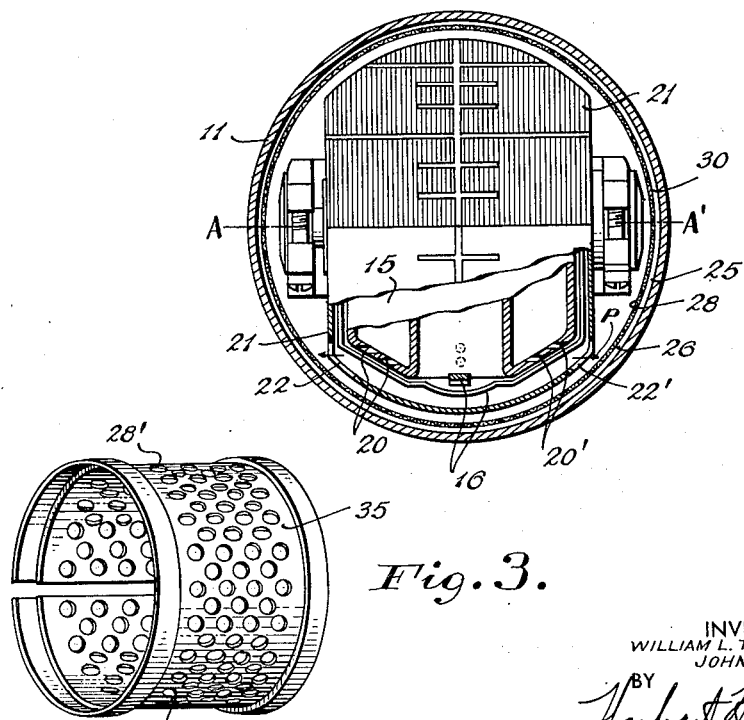
INVENTORS
WILLIAM L. TRACY, ORLAND E. ESVAL,
JOHN W. ROBINS
BY
their ATTORNEY Patented July 11, 1950

2,514,426

UNITED STATES PATENT OFFICE 2,514,426

GYROSCOPIC APPARATUS

William Low Tracy, Port Washington, and Orland E. Esval, Huntington, N. Y., and John W. Robins, Westwood, Mass., assignors to The Sperry Corporation, a corporation of Delaware Application January 25, 1946, Serial No. 643,266

14 Claims. (Cl. 74—5.43)

1

This invention pertains to an improvement in gyro instruments having a cylindrical instrument casing.

The problem posed in this invention is one of creating means to overcome the loss of erecting action about the roll axis of a gyro in the construction of a small gyro-vertical or other gyro instrument whose casing, being in the form of a cylinder, permits but very little clearance between the pitch erection jets or orifices and the inside curvilinear surface of the casing. This construction causes the air from the orifices to impinge upon this curvilinear or annular surface and to be deflected therefrom to the rotor case, gimbal and a gyro shell, when included, which action has the resultant effect of decreasing the net pitch erection torque. The gyro shell is described in patent application Serial No. 638,858, of William L. Tracy for Gyroscopic Apparatus, filed January 3, 1946.

Therefore, a primary object of this invention is to provide means to overcome the above defect.

Another object of this invention is to provide an air trap contiguous to the inside surface of an instrument case adapted for small gyro-vertical apparatus.

Still another object of this invention is to provide a permeable air baffle for a gyro-vertical device.

The invention in another of its aspects relates to novel features of the instrumentalities described herein for achieving the principal objects of the invention and to novel principles employed in these instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

A still further object of this invention is to provide air rebound velocity dissipating means effectively adjacent the pitch erection jets in a gyro-vertical for different operating positions of these jets.

Other objects and advantages of this invention will become apparent as the description proceeds.

In the drawings,

Fig. 1 is a side elevation view of a gyro-vertical, having part of the instrument casing cut away to show a cross sectional view of the jet air rebound velocity dissipating means;

Fig. 2 is an end elevation view of a gyro-vertical showing the instrument casing in section exposing the gyro shell, having a fragmentary section taken therethrough at the bottom to show the positional relationship of the rotor case, orifices therein, erecting means and the air trap means; and Fig. 3 is a perspective view of a modification of the screen used in the jet air rebound velocity dissipating means.

Referring particularly to Fig. 1 of the drawing, there is shown a pneumatically erected gyro-vertical which, for the purpose of this disclosure, has its description rather condensed since the overall plan is delineated extensively in patent applications Serial Nos. 638,858 and 640,665 now Patent No. 2,504,166, of William L. Tracy for Gyroscopic Apparatus, filed January 3, 1946, and January 11, 1946, and since the invention herein pertains to a limited phase of a new gyro construction. This phase is devoted to means for eliminating an adverse torque about the roll axis or gimbal axis when the pitch erecting jets, during an erecting action impinge upon either a round instrument casing 11 or any other intermediate casing, causing the rebounding air to strike the rotor case and other parts. Succinctly stated, the improvement of a gyro-vertical, which it is desired to describe herein, may be characterized as an air trap or jet air rebound velocity dissipating means within this casing 11. Exteriorly viewed, the gyro-vertical is also provided with a filter case 12 and an air connection 13. Instrument casing 11, shown in a substantially full section cut, exposes a gimbal 14, a rotor case 15 pivoted about axis A—A' therein, with pendulously hung deflectors such as stirrup-shaped ones 16 attached thereto, so that the deflectors partially block orifices such as 20, 20' used for pitch erecting jets, all as described within patent application No. 638,858. A gyro shell 21 with ports or openings 22, 22' opposite or in line with the erection jets of orifices 20, 20', respectively, surrounds or encloses the rotor case 15 completely, as also described in that patent application. Since the problem of this case resolves itself into one of maintaining the erection rates of the gyro in pitch the same as those for a rolling action of the craft to which the gyro is attached, and the clearance between the sides of the casing 11 and the rotor case is small, it is recognized that it is necessary to create means to prevent a rebound of jet air impinging upon casing 11 from returning to the rotor case 15 or shell 21, when one is used, and to the gimbal 14. The jets from orifices 20, 20' strike the inside of the annular surface of the round or cylindrical casing 11, causing a substantial amount of it to be reflected back to its point or points of origin, thereby causing an opposite torque about the roll axis B, B' from that caused by the initial pitch erection jet, and also a great portion of this reflected or rebounding air travels in a sort of whirl of air around the interior of the casing surrounding the gyro instrument to produce like adverse action of a rather indeterminate nature. Therefore, it is deemed necessary to only show orifices 20, 20' even though the gyro-vertical axis must also have another set of opposed orifices lined up at right angles to a line joining the described orifices 20, 20', since the second pair of orifices (not shown) normally issue jets of air toward the ends of the casing 11 and paralleling the sides thereof, for stabilizing the gyro while the craft is in roll. Thus, it is seen that the subject problem arises for the particular gyro-vertical described, only in the case of pitch erection action of the same.

The detailed construction of the bearing enclosed within the filter case 12, whereby the axis of the gimbal 14 or roll axis BB' is defined, is found in patent application No. 640,665. Filter case 12 further contains a screen or filter for cleaning the air as it enters a double-race bearing both shown in that application. Air is drawn through the rotor and erection jets via this screen and gimbal 14 having conventional air paths or ducts therein as shown in the patent to Carter, No. 2,190,698, by attaching any well-known air or vacuum pump to the hose connection 13 leading into the interior of the instrument casing 11. The instrument may also be operated by blowing a continuous blast of air directly into the air filter.

In the specific embodiment of this invention, the instrument casing 11 is shown as being cylindrical. An air trap or jet air rebounding velocity dissipating device is formed interiorly of this casing by first cutting a shallow annular groove or undercut 25 on the longitudinal surface or sides of the same and for a substantial length thereof. The undercut or relieved region 25 is preferably characterized by a two-step annular recess formation, the first step being considered as outlining the bottom portion 26 while a second step delineates an outer portion or shelf 27 into which a screen, interstitial substance or air penetrable baffle 28 is fitted, leaving a void or air trap formed behind this baffle 28. It will be clear from Fig. 1 and the position of the air exit 13 that this air trap is a closed, or dead-end space which air can only enter or leave by passing through baffle 28. Any air which, after leaving apertures 22, 22', passes through the baffle must rebound from the interior wall of outer casing 11, and return through the same baffle before escaping by the exhaust pipe 13. There is no thoroughfare for air through the trap 30. In this manner the velocity of the rebounding air is reduced to a harmless value. The longitudinal dimensions of the bottom portion 26 of the recess or shallow groove 25 is such that after the screen 28 is fitted over the outside portion of the recess 25, the resultant air trap 30 covers a sufficiently large interior annular area of the instrument casing 11 whereby the air trap is made effective over large predetermined angles of pitch of the craft or gyro rotor case with its shell 21. When the pitch erection jets attain a certain position from their normal direction, which is substantially in the plane passing through the pitch axis of the gyro case and at right angles to the axis of the cylindrical casing 11, the previously described condition of rebounding jet air is practically nonexistent since the jets now are directed to or approach the interior side surface 32 of this casing at oblique angles to this surface, i. e., the air flows toward the ends 33 and 34 of the casing 11.

In Fig. 2 of the drawing, it is assumed for the purpose of schematically illustrating the effect of the air trap 30, that the gyro rotor case is slightly inclined away from its normal substantially vertical position as a result of the gyro-equipped craft pitching, producing a pitch erection jet labeled p emitted from orifice 20'. This jet is effective in producing an erecting action as soon as it reaches a position immediately exterior of the shell 21 from its port 22', and therefore further action of this jet is unnecessary and undesired. Jet p traveling in a straight path substantially in line with the interstices of the air pervious substance 28, is permitted to reach the annularly curved smooth surface of the portion 26 of the undercut 25, where it is literally reflected into a multitude of paths within the confines of the void 30 which, due to its resultant action, is expressed as an air trap. Some of these air paths travel in opposite directions around the air trap, eventually colliding with each other and thereby killing their velocity, while the remainder of these boxed-up or trapped air streams strike the sum total of all the material, circumscribing each and every interstice of the air baffle or screen 28 at an angle effectively normal thereto to dissipate the velocity of the remaining air streams. Thus, it is seen that the annular screen 28 and recess 25 together constitute jet air rebound velocity dissipating means.

While the air permeable baffle 28 is shown and described as being recessed into a step or shelf 27 of the annular undercut 25, the scope of this invention is not to be limited by such a precept. For instance it would be entirely feasible to avoid a two-step undercut by simply fitting the annular screen 28 over the uncut interior region of the curved casing 11. In this event it may be necessary to sacrifice the rigidity of the casing by lessening the thickness of its walls and/or increasing the diameter of the casing. No limitation on the materials used in the screen 28 is to be used against the inventor even though the particular embodiment of the present invention contemplates a metallic screen. The use of materials such as spun glass, plastic materials easily worked into forms having interstitial bodies, or other suitable materials in which a myriad of substantially parallel pores could be produced might well be substituted for a metallic screen. Furthermore, it is desired to reveal herein that should it be found desirable to increase the diameter of the instrument casing 11, a jet air rebounding velocity dissipating device can be formed by placing and adhering narrow annular and longitudinally spaced spacers of any suitable material on the outside end surfaces of the selected baffle or screen material and then inserting this resultant composite structure within the interior of the casing 11. A void or air trap such as the air trap 30 is now formed between a smooth uncut interior region of the casing 11 and an outside depressed annular surface of the composite baffle. The composite baffle may be made in one piece also.

Hence in Fig. 3 there is shown another embodiment of the baffle or screen 28, so constructed that the necessity of cutting an undercut 25 within the inside of the casing 11 is overcome. This is accomplished by forming a one-piece cylindrical screen 28' to a two-diameter hollow annular-shaped body, the smaller diameter body 35 being centrally located therein and embracing the greater area of this screen. Thus, it is seen that the screen 28' contains a depressed portion which, when the screen is inserted and fitted tightly within the cylindrical instrument casing, cooperates with the interior smooth curved walls of the cylinder to produce an air trap or void similar to the air trap 30 described heretofore. The construction of screen 28' is simplified by making it out of a thin sheet of suitable material preferably metallic in character for the cutting or punching of a multitude of closely spaced holes 36 therein and then rolling this perforated material into the form described above.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pneumatically erected gyro-vertical comprising a cylindrical instrument casing, a rotor case gimballed for pitch within said cylindrical casing, at least two opposed orifices in a lower portion of said rotor case issuing jets of air against the inside walls of said casing normally in a plane perpendicular to the axis of said cylindrical casing and passing through the gimbal pitch axis, said casing having an interior undercut, and an air screen inserted into part of said undercut creating an air trap behind said screen whereby said jets are prevented from rebounding to the rotor case and other undesired torque-producing locations.

2. A pneumatically erected gyro-vertical comprising a rotor case, a curved casing, a least two opposed orifices in a lower portion of said rotor case issuing jets of air against the inside curved walls of said casing, a curved air screen with a substantial longitudinal dimension, and separation means between said screen and said walls ultimately forming an air trap behind said screen whereby said jets are trapped.

3. A pneumatically erected gyro-vertical comprising a rotor case, opposed air jets in a lower portion of said case, a cylindrical instrument casing with an interior annular stepped recess for a substantial portion of the same, and an air screen fitted into the shallower outside steps of said recess forming a void between said screen and the deeper bottom of said recess whereby the velocity of the air rebounding from said casing is dissipated.

4. A pneumatically erected gyro-vertical comprising a rotor case, a curved casing surrounding said rotor case, opposed orifices in a lower portion of said rotor case ejecting jets of air, said jets impinging against the inside curved walls of said casing, said casing having an interior undercut along said curved walls, and an air penetrable baffle fixed over said undercut leaving a cavity between said baffle and the bottom of said undercut whereby air directed to said baffle has its harmful velocity dissipated.

5. In a pneumatic gyro instrument, the subcombination comprising an outer stationary casing surrounding the gyro rotor case, said casing having a smooth annular interior undercut for a substantial length thereof, and a screen fixed over said undercut producing an air trap between the bottom of said undercut and said screen.

6. In a pneumatic gyro instrument, the subcombination comprising a cylindrical instrument casing surrounding the gyro and jet erecting air rebound velocity dissipating means fitted interiorly of and directly on said casing for a substantial length thereof.

7. In a pneumatic gyro instrument, the subcombination comprising an outer stationary casing surrounding the gyro rotor case, said casing having an interiorly relieved annular region and a screen recessed into part of said region producing an air trap between the bottom of said region and said screen.

8. In a pneumatic gyro instrument, the subcombination comprising a cylindrical casing with a two-step annular interior undercut for a substantial length thereof, and an air permeable baffle recessed into a first step of said undercut producing an air trap between said baffle and the bottom of said undercut.

9. In a pneumatic gyro instrument, the subcombination comprising a cylindrical casing surrounding the gyro and a screen having an annular centrally located depressed portion with a substantial longitudinal dimension, said screen being inserted and fitted tightly within said casing to form an air trap between said depressed portion and the interior curved walls of said casing.

10. A pneumatically erected gyro-vertical comprising a rotor case gimballed for pitch with at least two opposed orifices issuing jets of air from a lower portion thereof, a rotor case-enclosing gyro shell having several openings, each being opposite one of said orifices, a curved instrument casing with long sides surrounding said shell, said casing having an interior undercut for a substantial length thereof, and an interstitial substance fitted into said undercut for a part of the depth thereof, said jets normally striking said curved casing sides in a plane through the gimbal axis at right angles to the longitudinal dimension of said casing.

11. In a pneumatically erected gyro-vertical wherein exists a rotor, a rotor case, means for supporting the same for oscillation about horizontal axes in substantially neutral equilibrium, erecting means including several opposed jets issuing normally horizontally from a lower portion of said rotor case, pendulous means for differentially intercepting said jets, the combination with said erecting means of a cylindrical instrument casing with an undercut for a substantial portion of the inside body part of the same, and a permeable baffle fitted into said undercut for a part of the depth thereof, whereby air jets directed against said baffle are trapped behind the same until the velocity of said air is reduced to a negligible value.

12. In a pneumatic gyro instrument in combination an air-driven gyro rotor, a case containing said rotor and having apertures through which the spent air issues after driving said rotor, an outer instrument casing surrounding said rotor case and an air-penetrable baffle supported by said casing between said casing and said case so that the spent air after issuing from the said apertures may pass through said baffle into and out of the closed space between said baffle and the inner surface of said casing whereby air directed to said baffle has its harmful velocity dissipated.

13. In a pneumatic gyro instrument in combination an air-driven gyro rotor, a case containing said rotor and having apertures through which the spent air issues after driving said rotor, an outer instrument casing surrounding said rotor case, a two-step annular undercut in the inner face of said casing extending along a substantial portion of the length thereof and an air-permeable baffle recessed into a first step of said undercut producing a dead end air trap between said baffle and the bottom of said undercut whereby air directed to said baffle has its harmful velocity dissipated.

14. In a pneumatic gyro instrument in combination an air-driven gyro rotor, a case containing said rotor and having apertures through which the spent air issues after driving said rotor, an outer instrument casing with a smooth cylindrical inner face surrounding said rotor case and a cylindrical baffle having circular end pieces adapted to fit closely inside said casing and an air-permeable middle portion of smaller diameter forming a closed space between said baffle and the inner surface of said casing whereby air directed to said baffle has its harmful velocity dissipated.

WILLIAM LOW TRACY.
ORLAND E. ESVAL.
JOHN W. ROBINS.

REFERENCES CITED

The following references are of record in the file of this patent:

UNITED STATES PATENTS

| Number | Name | Date |
|---|---|---|
| 244,471 | Moore | July 19, 1881 |
| 1,452,482 | Sperry | Apr. 17, 1923 |
| 1,932,412 | Keen | Oct. 31, 1933 |
| 2,014,800 | Deguenther | Sept. 17, 1935 |
| 2,078,729 | Lemoine | Apr. 27, 1937 |
| 2,225,568 | Obermeier | Dec. 17, 1940 |
| 2,249,744 | Carter | July 22, 1941 |
| 2,257,730 | Braddon | Oct. 7, 1941 |

FOREIGN PATENTS

| Number | Country | Date |
|---|---|---|
| 476,034 | Great Britain | Nov. 30, 1937 |

Certificate of Correction

Patent No. 2,514,426                                       July 11, 1950

WILLIAM LOW TRACY ET AL.

It is hereby certified that error appears in the printed specification of the above numbered patent requiring correction as follows:

Column 1, line 34, for the word "these" read *those*; column 3, line 12, before "must" strike out "axis"; column 5, line 42, for "a least" read *at least*; column 7, line 3, for "sad" read *said*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*